United States Patent [19]

Elattar

[11] Patent Number: 4,545,797
[45] Date of Patent: Oct. 8, 1985

[54] PROCESS FOR MANUFACTURING POROUS SLAG

[75] Inventor: Azza A. Elattar, Wappingers Falls, N.Y.

[73] Assignee: Texaco Inc., White Plains, N.Y.

[21] Appl. No.: 503,972

[22] Filed: Jun. 13, 1983

[51] Int. Cl.[4] ............................................. C03C 15/00
[52] U.S. Cl. .......................................... 65/19; 65/31; 156/654; 156/662; 106/117
[58] Field of Search ...................... 65/31, 19; 428/489; 156/662, 654; 106/117

[56] References Cited

U.S. PATENT DOCUMENTS

| | | | |
|---|---|---|---|
| 3,881,944 | 5/1975 | Beall et al. | 65/31 X |
| 4,057,512 | 11/1977 | Vadovic et al. | 48/202 X |

FOREIGN PATENT DOCUMENTS

| | | | |
|---|---|---|---|
| 2406466 | 6/1979 | France | 65/19 |

*Primary Examiner*—Robert Lindsay
*Attorney, Agent, or Firm*—Robert A. Kulason; Carl G. Seutter

[57] ABSTRACT

Inert slag is calcined and treated with aqueous base or acid to yield product characterized by high surface area.

6 Claims, 9 Drawing Figures

PROCESS FOR MANUFACTURING POROUS SLAG

FIELD OF THE INVENTION

This invention relates to the treatment of glassy slag. More particularly it relates to the treatment of glassy slag from a coal gasification operation to increase the porosity thereof.

BACKGROUND OF THE INVENTION

As is well known to those skilled in the art, glassy slag may be a by-product of various industrial operations including those wherein coal ds burned with production of molten by-products which are generally referred to as slag. The composition of these inert glassy slags may vary depending on whether they are derived from metallurgical, petroleum, or coal industries, although they are generally characterized by a low surface area (in terms of square meters per gram of slag) whether as large particles or as small particles.

It is an object of this invention to provide a process for improving the properties of such slags. Other objects will be apparent to those skilled in the art.

STATEMENT OF THE INVENTION

In accordance with certain of its aspects, this invention is directed to a process for treating an inert glassy slag having a low surface area which comprises
  leaching said inert glassy slag having a low surface area in aqueous medium in the presence of (i) base having a $pK_b$ of about 2–6 or (ii) acid having a $pK_a$ of about <1–5 thereby forming a leached slag of increased surface area; and
  recovering said leached slag of increased surface area.

In accordance with certain of its other aspects, this invention is directed to a leached slag of increased surface area prepared by the process which comprises
  leaching an inert glassy slag having a low surface area in the presence of (i) base having a $pK_b$ of about 2–6 or (ii) acid having a $pK_a$ of about <1–5 thereby forming a leached slag of increased surface area; and
  recovering said leached slag of increased surface area.

DESCRIPTION OF THE INVENTION

The charge, inert glassy slags, which may be treated by the process of this invention include heterogeneous mixtures derived as by-products from metallurgical operations, from petroleum operations, from the combustion (e.g. gasification) of coal, etc. These slags represent unwanted components of the charge materials admitted to these operations: and their composition may vary over a wide range. They typically contain so-called acidic oxide components, most commonly silica, but also including alumina, chromia, molybdena, etc. as well as so-called basic oxide components including metals of Group IA of the Periodic Table typically sodium, or metals of Group IIA of the Periodic Table, most commonly calcium or magnesium. In some instances the predominant species present in the slag may be considered to be a calcium silicate. Other species may be present including iron sulfides or oxides of manganese, copper, titanium, vanadium, etc.

These slags are characterized by high melting points, usually above 1200° C., high thermal stability, high chemical inertness, and by a very low surface area whether as a particle (say 2 mm to 10 cm in largest dimension) or as a fine powder (say 2 mm down to micron sizes in largest dimension). Generally the surface area may be 0.3–0.9 square meters per gram of slag charge. For example, a typical slag of particle size of 3 mm may have a typical surface area of only 0.5 square meters per gram. When carbon is present in the charge slag, the measured surface area will reflect this fact–i.e. it will appear to be high. It will however be found that if the carbon be removed by calcining, the actual area of the slag is very low—typically 0.5 square meters per gram.

A typical glassy slag may be that obtained as a by-product of gasification of Illinois No. 6 Coal (a low grade coal) by the Texaco Coal Gasification Process as described for example in U.S. Pat. No. 2,871,114 of Texaco. This coal may contain 8 w % water and may be characterized, on a dry basis, as follows:

TABLE

| Illinois No. 6 Coal (dry basis) Analysis | |
| --- | --- |
| Property | Value |
| Density (g/cc) | 1.27 |
| Surface Area (sq. m/g) | 51 |
| Ash (w %) | 9.2 |
| Components | w % |
| Carbon | 70.2 |
| Sodium | 0.01 |
| Magnesium | 0.05 |
| Calcium | 0.38 |
| Silica | 4.40 |
| Alumina | 1.60 |

The glassy slag obtained by the gasification of the above charge may typically be characterized as follows:

TABLE

| Property | Value |
| --- | --- |
| Water (w %) | 2 |
| Density (g/cc) | 2.51 |
| Surface Area (sq. m/g) | 0.5 |
| Particle Size (average) | 3 mm |
| Components (dry basis) | w % |
| Carbon | 7.92 |
| Sodium | 2.20 |
| Magnesium | 0.97 |
| Calcium | 3.50 |
| Silica | 42.85 |
| Alumina | 20.77 |

It is preferred that the glassy slag, to be admitted to the leaching operation of this invention, contain not more than about 1 w % carbon. Accordingly, if the charge slag contains carbon above this content (as is the case with the above illustrated slag), it is preferred to subject it to calcination at 500°–600° C., say 600° C. for 1–3 hours, say 3 hours in an oxidizing atmosphere. Although it may be possible to use oxygen or oxygen-enriched air as the oxidizing atmosphere, it is preferred to utilize air.

During calcination under these conditions, the carbon content of the charge slag is lowered from an initial content of 1–10 w %, say about 7 w % down to a final carbon content of less than about 1 w %, typically 0.1–1 w %, say 0.8 w %. The other properties of the so-oxidized slag are found to be essentially the same as those of the glassy charge slag.

The slag containing less than about 1 w % carbon, preferably the calcined slag, is subjected to leaching in aqueous medium. If the average particle size of the slag is not within the range of 0.1-3 mm, it may be reduced, prior to leaching, as by grinding in a hammer mill, or a ball mill, or a rod mill, followed by sieving to obtain desired fractions. Preferably substantially 100% of the slag should have a particle size in the range of 0.1-3 mm.

Leaching is preferably effected in aqueous medium in the presence of (i) a base preferably an inorganic base having a $pK_b$ of about 2-6, preferably about 3.5 typified by sodium hydroxide, potassium hydroxide, sodium carbonate, trisodium phosphate sodium metasilicate, calcium hydroxide, etc. or a combination thereof or (ii) an acid, preferably an inorganic acid having a $pK_a$ of about <1-5, preferably about 3.2 typified by hydrofluoric acid, hydrochloric acid, sulfuric acid, phosphoric acid, chlorosulfonic acid, nitric acid, or a combination thereof.

One preferred agent is a 20-35 w %, say 30 w % aqueous solution of sodium hydroxide. A more preferred leaching agent is a 6-16.3 w %, say 6 wt % aqueous solution of hydrogen fluoride.

Leaching may be effected at 20° C.-80° C., say 25° C. for 10-60 minutes, say 15 minutes. Preferably 100 parts by weight of solid are immersed in 750-1200 parts, say 1000 parts by weight of aqueous leaching agent: and the mix is agitated for the requisite period.

During leaching, a small portion of the glassy slag is dissolved in the solution. Control of the conditions leaching, including temperature, time, amount and concentration of leaching agent, and degree of agitation will insure that the product leached glassy slag has the desired high surface area.

The leached slag is particularly characterized by a substantially increased porosity and surface area. The original glassy slag which has essentially zero porosity is now found to be highly porous; and the surface area which was originally essentially non-existent is now found to be 1-20, say 13.5 square meters per gram for a product slag having a particle size of 0.1-3 mm, say less than 0.19 mm.

The product so-prepared may be used in building materials, in ceramics manufacture, in the cement industry, and as a catalyst support. In a typical instance, 100 parts of 0.1-3 mm leached coarse glassy slag may be immersed in 0.5-4 w %, say 1.5 w % aqueous solution of chloroplatinic acid at 25° C.-80° C., say 25° C. for 1-2 hours, say 2 hours followed by drying at 110° C.-120° C., say 120° C. for 1-16 hours, say 8 hours, followed by reduction in hydrogen at 200° C.-500° C., say 500° C., for 1-2 hours, say 1 hour. The so prepared supported catalyst may be used in the hydrogenation of butene to butane, benzene to cyclohexane, etc.

DESCRIPTION OF PREFERRED EMBODIMENTS

Practice of the process of this invention will be apparent to those skilled in the art from the following wherein as elsewhere in this specification, all parts are parts by weight.

EXAMPLES I-II

In this series of Examples, the charge slag was obtained from a coal gasification unit wherein Illinois No. 6 Coal (a low rank coal) had been gasified according to the process of U.S. Pat. No. 2,871,114. The slag was screened to form a fine slag (20%) and a coarse slag (80%). The properties of each were as follows:

TABLE

| Fine Slag | |
| --- | --- |
| Property | Value |
| Particle Size (microns) | 10-250 |
| Surface area (sq. meters/g) | 51.3 |
| Bulk Density (g/cc) | 0.59 |
| Composition | w % |
| Organic Carbon | 27 |
| Silica | 45.6 |
| Alumina | 17.3 |
| Iron oxides | 18.0 |
| Calcium oxide | 4.4 |

TABLE

| Coarse Slag | |
| --- | --- |
| Property | Value |
| Particle Size (microns) | 250-3000 |
| Surface area (sq. meters/g) | 0.5 |
| Bulk Density (g/cc) | 1.33 |
| Composition | w % |
| Organic Carbon | 7.9 |
| Silica | 46.8 |
| Alumina | 16.8 |
| Iron oxides | 17.0 |
| Calcium oxide | 3.92 |

Each of these materials was dried at 110° C. for 2 hours.

Figure 1:
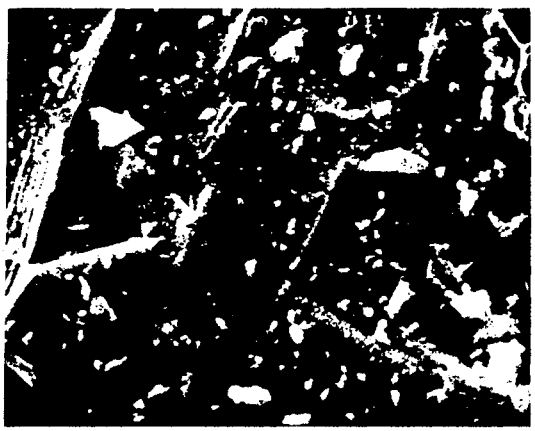
FIGS. 1-9 are photographs taken from a scanning electron microscope-(2000×) wherein the longest dimension of each photograph represents a distance of fifty microns—of the products described in detail in Examples I-II.

In Example I, the coarse glassy slag was examined under a scanning electron microscope. FIG. 1 is a photograph taken in the scanning electron microscope of the charge slag. This material appeared to be extremely smooth and in fact it had a low surface area (only 0.5 sq. meters/gram).

Figure 2:
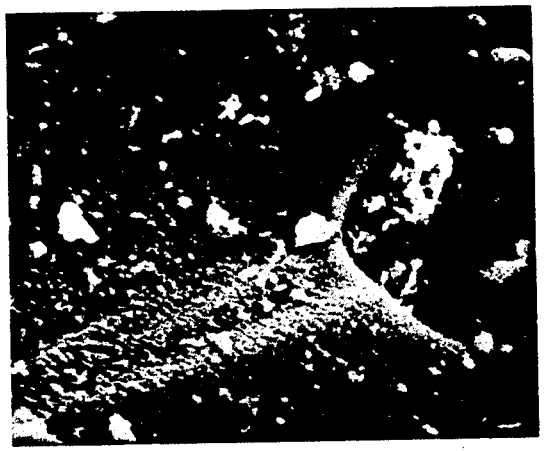

The coarse glassy slag was calcined at 600° C. for 3 hours in air and, after cooling to room temperature of 25° C., was examined. The photograph FIG. 2 shows that the product was essentially as smooth as the uncalcined slag. The surface area of the calcined slag was 0.5 sq. meters per gram.

Figure 3:
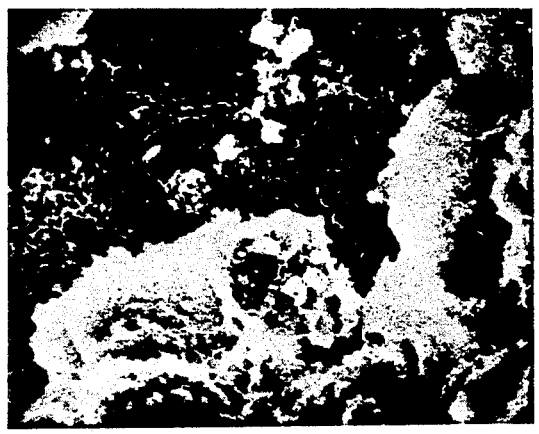
Figure 4:
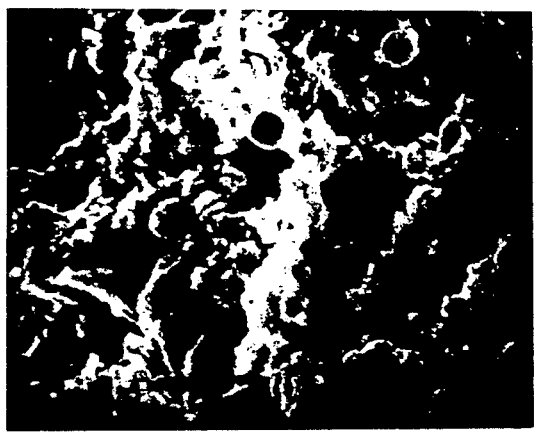

The cooled calcined coarse slag was immersed at 80° C. for 2 hours in a 30 w % aqueous solution of sodium hydroxide and allowed to stand for two days at room temperature. The leached materials were washed with water several times. FIGS. 3 and 4 are scanning electron microscope photographs of different portions of the slag. As may be readily observed, the slag is no longer smooth but is characterized by a highly irregular surface and by the presence of a large number of interstices. The surface area of this material is found to be 2.6 square meters per gram.

In Example II, the charge slag was the fine slag described above. It was treated in manner identical to the treatment for the coarse slag of Example I except that it was treated with aqueous caustic for 10 minutes (rather than 2 hours).

Figure 5:
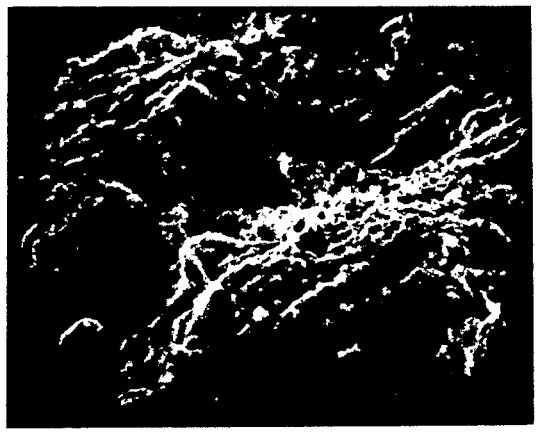

From FIG. 5, it may be observed that the surface of the dried fine slag has a fine texture. The measured surface area is 51.3 square meters per gram. The high surface area was due to the presence of undesired carbonaceous material (representing more than 30 w % of the fine slag).

Figure 6:
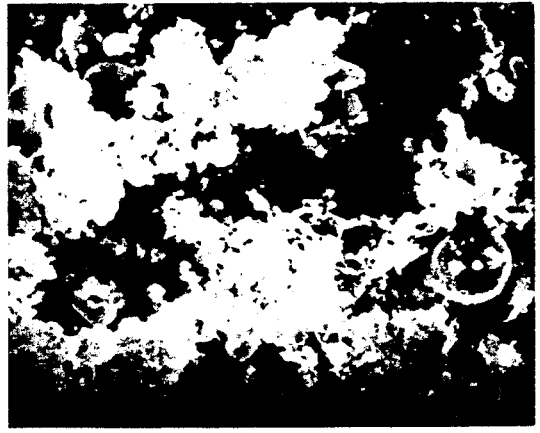

From FIG. 6, it may be observed that the texture of the calcined fine slag has a spherical glassy smooth surface. The carbon which contributed the high surface area has been oxidized and removed. The measured surface area is 2.3 square meter per gram.

Figure 7:
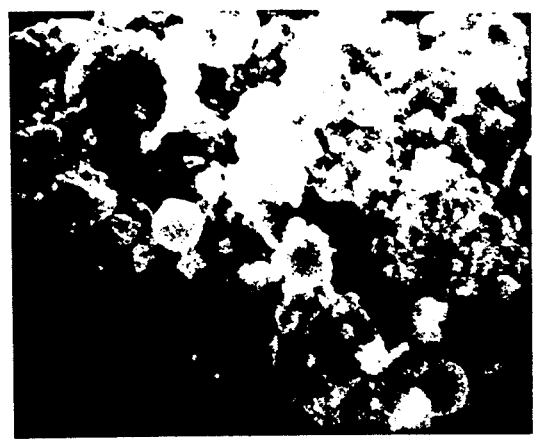

From FIG. 7, it may be observed that the leached calcined fine slag has an increase in surface area (the grains were etched and rough surface was generated). The measured surface area is 4.3 square meters per gram.

EXAMPLES III-XI

In this series of Examples, the surface area of calcined coarse glassy slag was measured. Portions of this slag were ground in a ball mill and then sieved to produce aliquots having a particle size of (i) 100% on 30 mesh, (ii) 100% on 60 mesh, (iii) 100% on 80 mesh and (iv) 100% through 80 mesh. A portion of each aliquot was leached at room temperature for 15 minutes with 6 w % aqueous hydrogen fluoride. The surface area of the unleached and the leached aliquots was measured.

| Example | Leached | Particle Size | Surface Area Sq. meters/gram Unleached | Leached |
|---|---|---|---|---|
| III | — | 0.125 inch | 0.5 | |
| IV | — | 30 mesh | 0.3 | |
| V | Y | 30 mesh | | 1.3 |
| VI | — | 60 mesh | 0.7 | |
| VII | Y | 60 mesh | | 1.4 |
| VIII | — | 80 mesh | 1.2 | |
| IX | Y | 80 mesh | | 3.9 |
| X | — | −80 mesh | 0.9 | |
| XI | Y | −80 mesh | | 13.5 |

Y means leached
— means unleached

From the above table, the following may be determined:
(i) as the unleached material is reduced in particle size, the surface area varies erratically;
(ii) as the leached material is reduced in particle size, the surface area desirably increases; and
(iii) it is possible to increase the surface area of the leached slag (when compared to the unleached slag) by a factor of 13.5/0.9 or 15 times!. The particle size, shape, and porosity after leaching are noticeably different from the starting material.

Figure 8:
Figure 9:
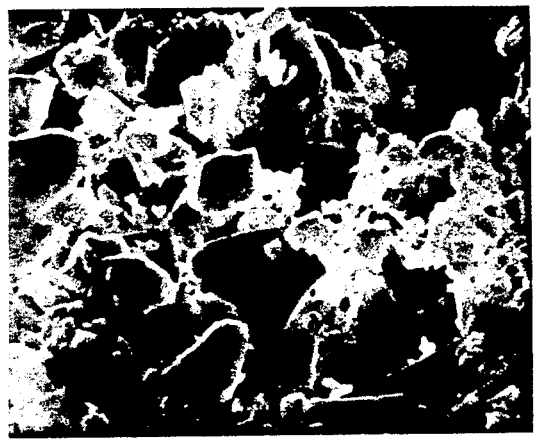

FIGS. 8 and 9 show the scanning electron microscope picture of the calcined coarse slag (Example X) and the leached slag (Example XI) respectively. It may be observed that the leached calcined slag FIG. 9, Example XI has an increased porosity, roundness of the grains (due to the etching at the edges), and smaller particles size than in the original material of FIG. 8, Example X.

The portion of the glassy slag dissolved in the hydrofluoric solution (Example XI) has the following composition:

| Element | (W %) |
|---|---|
| Si | 0.32 |
| Na | 0.22 |
| Al | 0.21 |
| Fe | 0.14 |
| Ca | 0.056 |
| K | 0.017 |
| Zr | 32 (ppm) |
| Ti | 27 (ppm) |
| Mg | 26 (ppm) |
| Mn | 4 (ppm) |
| Cr | 3 (ppm) |
| Ni | 2 (ppm) |
| V | 2 (ppm) |
| Co | <2 (ppm) |
| Mo | <2 (ppm) |
| Zn | <2 (ppm) |
| Cu | <1 (ppm) |

Results comparable to the above may be obtained if the slag is derived from:

TABLE

| Example | Slag |
|---|---|
| XII | Anthracite Coal |
| XIII | Bituminous Coal |
| XIV | Sub-bituminous Coal |
| XV | Lignite |

Results comparable to the above may be obtained if the leaching agent is an aqueous solution of:

| Example | Agent |
|---|---|
| XV | Nitric Acid |
| XVI | Hydrochloric Acid |
| XVII | Phosphoric Acid |
| XVIII | Sodium Carbonate |

Although this invention has been illustrated by reference to specific embodiments, it will be apparent to those skilled in the art that various changes and modifications may be made which clearly fall within the scope of this invention.

I claim:

1. A process for treating an inert glassy slag having a low surface area which comprises
treating an inert glassy slag having a low surface area in a one-step operation in the presence of (i) base having a $pK_b$ of about 2–6 or (ii) acid having a $pK_a$ of about <1–5 thereby forming a treated slag of increased surface area; and
recovering said treated slag of increased surface area.

2. A process for treating an inert glassy slag having a low surface area as claimed in claim 1 wherein said slag is treated with aqueous medium containing hydrofluoric acid, hydrochloric acid, or sulfuric acid.

3. A process for treating an inert glassy slag having a low surface area as claimed in claim 1 wherein said slag is treated with aqueous medium containing sodium hydroxide, trisodium phosphate, or sodium carbonate.

4. A process for treating an inert glassy slag having a low surface area which comprises
treating an inert glassy slag having a low surface area at 20° C.–80° C. for 15–60 minutes in aqueous medium in a one-step operation in the presence of (i) base having a $pK_b$ of about 2–6 or (ii) acid having a $pK_a$ of about <1–5 thereby forming a treated slag of increased surface area; and
recovering said treated slag of increased surface area.

5. A process for treating an inert oxide slag having a substantial carbon content which comprises calcining said slag at 500° C.–600° C. for 1–3 hours in an oxidizing atmosphere thereby forming an oxidized slag:

treating said oxidized slag at 20° C.–80° C. for 15–60 minutes in an aqueous medium in a one-step operation in the presence of (i) base having a $pK_b$ of about 2–6 or (ii) acid having a $pK_a$ of about $<1$–5 thereby forming a treated oxidized slag; and recovering said treated oxidized slag.

6. A treated glassy slag of increased surface area prepared by the process which comprises treating said inert glassy slag having a low surface area in a one-step operation in the presence of (i) base having a $pK_b$ of about 2–6 or (ii) acid having a $pK_a$ of about 1–5 thereby forming a treated slag of increased surface area; and recovering said treated slag of increased surface area.

* * * * *